Figure 4:
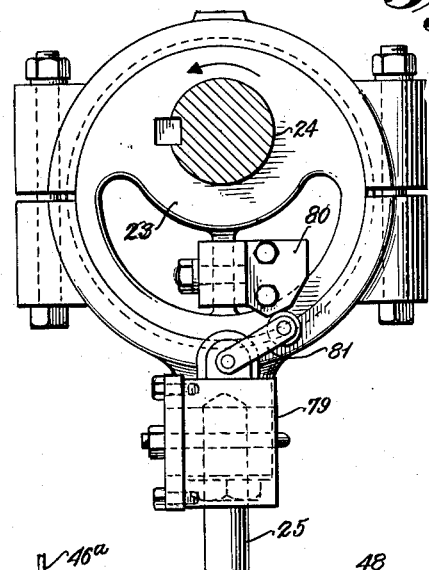

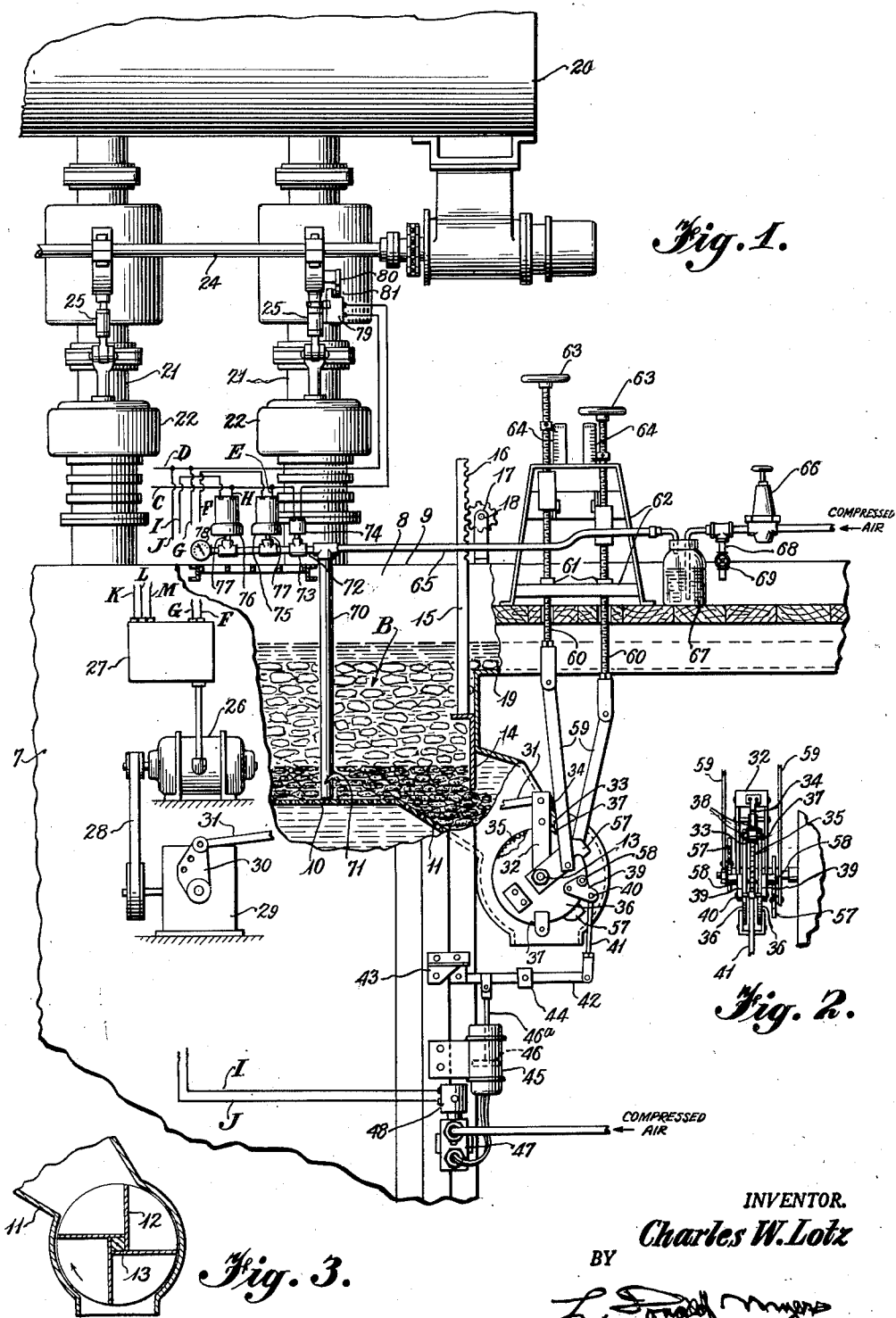

Aug. 12, 1952 — C. W. LOTZ — 2,606,661
WASH BOX DISCHARGE CONTROL
Filed Jan. 5, 1949 — 2 SHEETS—SHEET 2

Inventor
Charles W. Lotz
By L. Donald Myers
Attorney

Patented Aug. 12, 1952

2,606,661

UNITED STATES PATENT OFFICE 2,606,661

WASH BOX DISCHARGE CONTROL

Charles W. Lotz, Chicago, Ill., assignor to Link-Belt Company, a corporation of Illinois Application January 5, 1949, Serial No. 69,380

9 Claims. (Cl. 209—496)

This invention relates to new and useful improvements in wash box discharge controls and deals more particularly with an automatic discharge regulator adapted primarily for controlling the discharge of the high gravity stratum from a wash box which is designed for handling coal or other minerals.

Inasmuch as the rate of stratification of the high gravity particles in a wash box will vary considerably over a given period of time, it is conventional practise to intermittently discharge the high gravity particles in accordance with the depth of the bed or stratum of such particles in the wash box. One form of automatic control of the intermittent discharge of the high gravity stratum has, in the past, been dependent upon the use of a float having such a specific gravity that it responded to changes in the depth of the high gravity stratum.

The use of a float type control necessarily involves movement of the float in the bed of the wash box whereby it is subjected to mechanical injury, abrasion and corrosion. The life expectancy of the float is, therefore, limited. Further, the float stem must be guided by rollers which require lubrication for proper functioning of the float. Also, when it is desired to change the depth or consistancy of the high gravity stratum, mechanical adjustment of the control system and possibly changes in the weight of the float assembly are involved.

It is the primary object of this invention to provide a control device for use in connection with wash boxes to automatically regulate the discharge of the high gravity stratum therefrom in accordance with the depth of that stratum.

A further important object of the invention is to provide a control device for use in connection with wash boxes to automatically regulate the intermittent discharge of the high gravity particles therefrom in response to changes in the pressure required to force the wash water through the stratum of such particles.

A still further object of the invention is to provide an adjustable control device for use in connection with wash boxes to automatically regulate the discharge of the high gravity particles therefrom in response to changes in the pressure required to force the wash water through the stratum of such particles as its depth varies; adjustment of the control device acting to compensate for pressure variations due to changes in the total depth of the high and low gravity strata and the size content.

A further object of the invention is to provide a pressure responsive control device for automatically regulating the discharge of the high gravity particles from a wash box, the control device being in communication with the wash water whereby the pressure of water being forced through the stratum of such particles brings about actuation of the control to cause discharge of the high gravity particles when an increase in the depth of the stratum of such particles causes a predetermined increase in the pressure.

Other objects and advantages of the invention will be apparent during the course of the following description.

Figure 5:
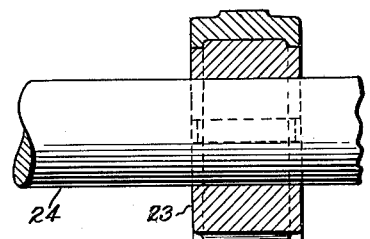
Figure 6:
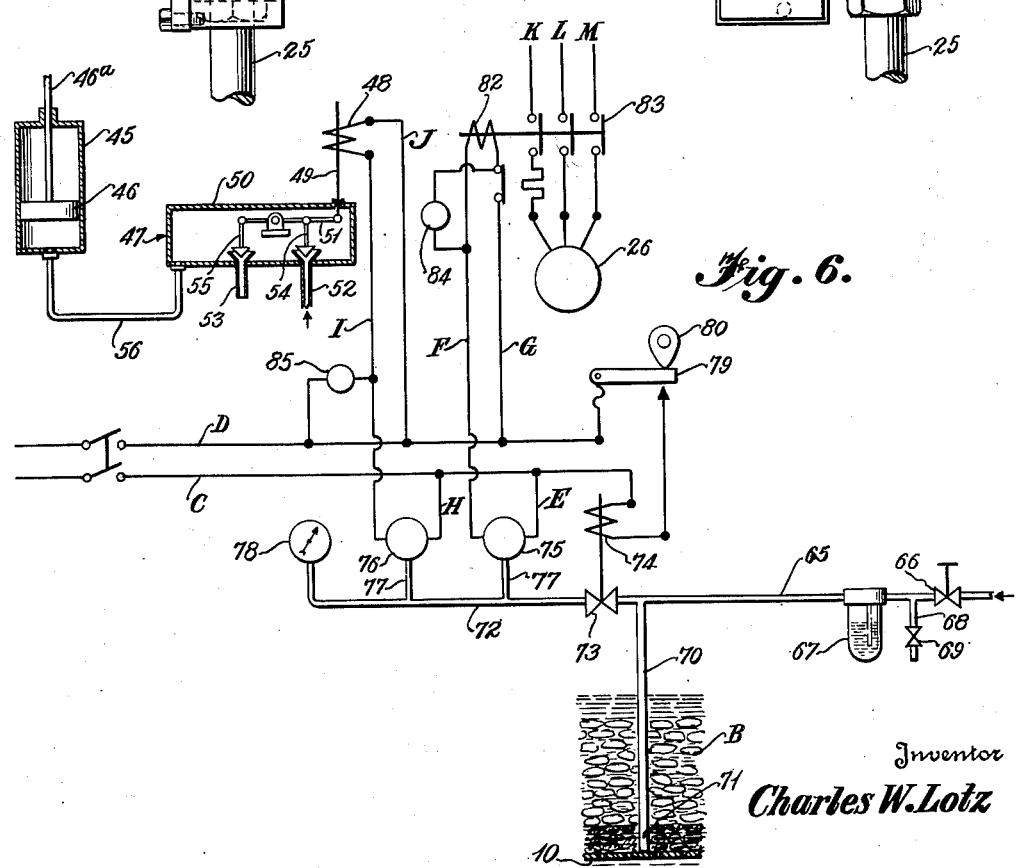

In the accompanying drawings forming a part of this specification and in which like numerals are employed to designate like parts throughout the same, Figure 1 is a fragmentary elevational view, partly broken away, of the discharge end portion of a wash box embodying this invention, Figure 2 is a detail elevational view of the discharge gate drive mechanism illustrated in Fig. 1, Figure 3 is a vertical sectional view of the discharge chute and gate illustrated in Fig. 1, Figure 4 is a detail side elevational view of the switch operating cam and follower illustrated in Fig. 1, Figure 5 is a partly elevational and partly sectional view of the switch and cam illustrated in Fig. 4, and Figure 6 is a diagrammatic view of the control system for a wash box.

In the drawings, wherein for the purpose of illustration is shown a preferred embodiment of this invention, and first particularly referring to Figs. 1, 2 and 3, there is shown a commercial form of washing jig that includes a wash box 7 which has its upper portion divided into front and rear sections by the longitudinally extending partition 8. The two longitudinal sections of the wash box 7 are in open communication beneath the lower edge of the partition 8 which lies in spaced relation to the bottom of the wash box. A pressure tight cover 9 closes the top of the rear longitudinal section.

The front longitudinal section of the wash box 7 is provided with a material bed supporting screen 10 having a downwardly inclined end portion 11 which acts as a discharge chute. The lower end portion of the discharge chute 11 is enlarged and so formed as to receive a rotary discharge gate 12 mounted on and carried by the shaft 13. A slide gate 14 acts to regulate the effective depth of the discharge chute 11 and is carried by a rod 15 having its upper end portion in the form of a rack 16 for engagement with the pinion 17 keyed to a shaft 18 which may be rotated to raise or lower the slide gate 14.

The end wall of the wash box 7 above the discharge chute 11 is provided with an exit sluice 19. An inlet sluice, not shown, similar to the exit sluice 19 may be utilized to introduce material to the opposite end portion of the wash box 7.

When the illustrated washing jig is in operation, the wash box 7 is provided with water up to a desired level. The pressure tight rear longitudinal section is connected to a compressed air receiver 20 through the air inlet pipes 21 which are provided with valves 22 that are operated simultaneously by the cams 23, rotated by the cam shaft 24, to impart reciprocating motion to the valve operating rods 25, as illustrated in Fig. 4.

When the valve operating rods 25 are in their lower position, the valves 22 permit compressed air to flow from the receiver 20 through the air inlet pipes 21 into the longitudinal section at the rear of the wash box 7. This compressed air forces the water in the rear section to pass under the lower edge of the partition 8 to force the water in the front section to rise through the material bed supporting screen 10 and the material bed B. When the valve operating rods 25 are in their upper position, the valves 22 act to close the air inlet pipes 21 and exhaust the compressed air from the rear longitudinal section. The water in the front section of the wash box will, therefore, seek the level of the water in the rear section whereby the water in the front section passes downwardly through the material bed B and its supporting screen.

A starting mixture of mineral particles of different specific gravities and wash water is sluiced, or otherwise introduced, into the feed end of the front section of the wash box 7. The mineral particles will be advanced lengthwise of the front section by the longitudinal hydraulic flow through the wash box 7. While advancing toward the exit end of the wash box 7, the mineral particles of different specific gravities are stratified by the pulsations of the water so that the higher gravity particles are concentrated at the bottom of the material bed B and can be withdrawn through the discharge gate 12. The lower gravity particles will collect along the upper stratum of the material bed B and will spill into the exit sluice 19 with a certain amount of water during each pulsation stroke.

The above structural features of the washing jig are conventional and are more completely illustrated and described in my copending application, Serial No. 753,524, filed June 9, 1947, now abandoned, for Method of and Apparatus for Continuously Cleaning and Separating Minerals of Different Specific Gravities.

The discharge gate 12 and its drive mechanism are of the type illustrated and described in the patent to E. J. Burnell et al., No. 2,106,204, dated January 25, 1938, and will be only briefly described as follows:

The motor 26, having a starting switch 27, is connected by the belt 28 to a speed reducer 29. It is to be understood that a direct coupling or other suitable device may be used to drivingly connect the motor 26 to the speed reducer 29. The speed reducer 29 is provided with a crank arm 30 having a connecting rod 31 pivoted to its outer end portion. The other end portion of the connecting rod 31 is pivotally connected to a radial arm 32 which is free to pivot about the shaft 13. The length of the radial arm 32 is greater than the length of the crank arm 30 so that rotation of the crank arm acts through the connecting rod 31 to impart oscillatory motion to the radial arm 32. The radial arm 32 carries a pawl 33 which is depressed by the spring 34 for engagement with the teeth of a ratchet wheel 35 which is keyed to the shaft 13. The oscillating motion of the radial arm 32, therefore, imparts an intermittent rotation to the discharge gate 12 which is carried by the shaft 13.

Control of the effective length of intermittent rotary motion of the discharge gate 12 is provided in the following manner:

A pair of cam discs 36 are rotatably mounted on the shaft 13 adjacent opposite sides of the ratchet wheel 35 and are each provided with a similarly located stepped portion 37 for engaging a roller 38 on the pawl 33 to lift the pawl from engagement with the ratchet during a portion of each throw or oscillation of the pawl. Rotation of the cam discs 36 to relocate their stepped portions 37, therefore, acts to determine that portion of the path of travel of the radial arm 32 through which the pawl 33 engages the ratchet teeth. Each cam disc 36 is provided with an extension arm 39, and a pin 40 connects the two extension arms to one end portion of an adjustable link 41. A lever 42 is connected to the other end portion of the adjustable link 41 and to a stationary bracket 43. Movement of the lever 42, therefore, will simultaneously rotate both of the cam discs 36 to adjust the effective length of the intermittent rotary motion of the discharge gate 12.

The lever 42 is provided with an adjustable counterweight 44 which will normally maintain the extension arms 39 in their lowermost position. This position of the extension arms 39 and their attached cam discs 36 limits the effective length of throw of the pawl 33 and the resulting rotation of the discharge gate 12 to a minimum value.

A cylinder 45 contains a piston 46 which is connected to the lever 42 through the piston rod 46a so that when compressed air is admitted to the cylinder, the piston rod is actuated to move the lever 42 and the attached extension arms 39 to their uppermost limit. This places the cam discs 36 in the position where the effective length of throw of the pawl 33 and the resulting rotation of the discharge gate 12 is at a maximum value. The admission of compressed air from a suitable source into the cylinder 45 is controlled by a valve 47 which is operated by a solenoid 48.

The movable armature of the solenoid 48 is provided with a rod 49 extended to enter the pressure sustaining casing 50 of the valve 47, as illustrated in Fig. 6. The end portion of the rod within the casing 50 is connected to a rocker arm 51 which is pivotally mounted within the casing. Compressed air enters the casing through the inlet 52 and is exhausted from the casing through the vent 53. A valve member 54 is mounted on the rocker arm 51 so as to close the inlet 52 when the free end portion of the rocker arm is depressed, and another valve member 55 is mounted on the rocker arm so as to close the vent 53 when the free end portion of the rocker arm is raised. In other words, when the inlet 52 is closed by the valve member 54, the vent 53 is open; and when the vent is closed by the valve member 55, the inlet is open.

The cylinder 45 is in communication with the casing 50 through the tube 56 so that when the vent 53 is closed the compressed air in the casing passes through the tube into the cylinder causing the piston rod 46a to be fully projected. On the other hand, when the vent 53 is opened, the compressed air in the casing 50 and the cylinder 45 is exhausted and the piston rod 46a is fully retracted by the force exerted by the weight 44, see Fig. 1.

In order to limit the maximum and minimum travel of the discharge gate, rotation of the cam discs 36 is limited by the rotatable arms 57 which are adapted to engage the pins 58 carried by the extension arms 39. Movement of the extension arms 39, therefore, is limited to the distance between the rotatable arms 57. The positions of the rotatable arms 57 may be adjusted by raising or lowering the connecting links 59 which are pivotally connected to the threaded adjusting shafts 60. The threaded adjusting shafts 60 pass through the nuts 61 which are rigidly connected to the support 62. The hand wheels 63 provide for turning the threaded adjusting shafts 60, and the index members 64 indicate the settings of the shafts.

The discharge gate 12 in the chute 11 does not operate continuously. Its periods of operation are controlled by an automatic device which is responsive to the depth of the stratum of heavier particles that accumulates adjacent the material bed supporting screen 10. In other words, when the stratum of heavier particles exceeds a prescribed depth the discharge gate 12 operates to discharge the heavier particles through the chute 11. If the depth of the stratum of heavier particles increases at a rate greater than the discharge rate through the chute 11, the cam discs 36 must be adjusted to increase the rate of discharge by the gate 12 so that the thickness of the stratum of heavier particles will be reduced. The discharge gate 12 will continue to operate at this increased capacity until the thickness of the stratum of heavier particles is decreased to such a point that the capacity of the discharge gate may again be reduced to its normal rate. The discharge gate 12 will continue to operate at its normal rate until the thickness of the stratum of heavier gravity particles drops to a predetermined depth whereupon the operation of the gate will be stopped.

The present invention provides for the above discussed control of the thickness of the stratum of heavier particles in response to changes in the pressure required to force the wash water through the material bed B as the thickness of the stratum of heavier particles varies.

Referring now to Figs. 4, 5 and 6 for a detailed description of the mechanism employed for controlling the operation of the discharge gate 12, reference character 65 designates a pipe or tube, connected to a suitable source of constant pressure air, not shown, and having a pressure reducing valve 66 and an air flow indicator bulb 67 connected therein. A venting tube 68, controlled by the valve 69, permits bleeding off of any desired amount of the air flowing through the tube 65 for adjusting the pressure of the air independently of the valve 66. The air from the tube 65 passes into the pipe 70 which extends downwardly through the material bed B in the wash box 7 to the material bed supporting screen 10.

The level of the water in the wash box 7 will, of course, vary with each pulsation, but its lowest level will normally lie some distance above the level of the screen 10. The pipe 70 is provided with a small opening 71 in its lower end portion for discharging the air into the material bed B and the wash water against the pressure of the water at the point of discharge. A header 72 is connected to the tube 65 at its point of juncture with the pipe 70 and is provided with a valve 73, operated by the solenoid 74.

Pressure responsive switches 75 and 76 are separately connected to the header 72 by the tubes 77 and are independently adjustable for closing or opening operation at a predetermined pressure, and for remaining in that condition until a predetermined change in pressure has occurred. For example, one of the switches can be adjusted to close at 1.6 pounds per square inch and to open at 1.5 pounds per square inch while the other switch is adjusted to close at 1.7 pounds per square inch and to open at 1.6 pounds per square inch. A pressure indicating gage 78 is connected to the header 72 for convenience in operating and adjusting the control mechanism.

Neglecting the insignificant amount of friction between the pipe 70 and the air flowing through the pipe, and the weight of this air, the pressure of the air in the pipe 70 may be assumed to be equal to the pressure exerted by the water resisting the discharge of the air from the opening 71. This hydrostatic pressure of the water will, of course, vary during each pulsion stroke of the water but, at a given point during each such stroke, the pressure will vary primarily in accordance with the thickness, and therefore the hydraulic resistance, of the material bed B to the flow of the water through the bed. In order to prevent large fluctuations of pressure in the header 72 during successive pulsion strokes of the water, the valve 73 is actuated to provide communication between the header 72 and the pipe 70 only during the same small portion of each pulsion stroke. The pressure in the header 72, therefore, is relatively constant, and will vary only in accordance with changes in the pressure of the water at the opening 71 which result from changes in the hydraulic resistance of the stratum of heavier particles in the bottom portion of the material bed B.

Intermittent action of the valve 73 in the manner described above results from a similarly intermittent actuation of the solenoid 74. To bring about this type of actuation of the solenoid 74, a switch 79 is mounted on one of the valve operating rods 25, see Figs. 1, 2 and 3, and a switch operating lug 80 is mounted for rotation with the cam 23 that actuates said rod. The switch operating lug 80 is arranged to engage the operating lever 81 of the switch 79 for a given portion and at a given point during each revolution of the cam 23. Inasmuch as the cam 23 controls the operation of valve 22 and, therefore, the pulsations of the wash water, and the operating lug 80 controls the actuation of switch 79 to open and close the valve 73, proper mounting of the switch operating lug 80 on cam 23 will provide for synchronization of the operation of the valve 73 with the pulsations of the wash water.

The wires C and D are connected to a suitable source of supply of electric energy for operating the valve 73 through the switch 79 and the solenoid 74. One side of the switch 69 is connected to the wire D and the other side of the switch 79 is connected through the solenoid 74 to the wire C.

The pressure responsive switch 75 controls an electrical circuit which is connected in parallel with the circuit through the switch 79. One side of the switch 75 is connected to the wire C by the wire E. The other side of the switch 75 is connected to one terminal of the solenoid 82, which controls the switch 83, by the wire F. The wire G connects the other terminal of the solenoid 82 to the wire D. An indicator lamp 84 may be connected in parallel with the solenoid 82 across the wires F and G to indicate energization of this circuit.

The pressure responsive switch 76 controls an electrical circuit which is connected in parallel with the two previously discussed circuits. One side of the switch 76 is connected to the wire C by the wire H. The other side of the switch 76 is connected by the wire I to one terminal of the solenoid 48. The wire J is connected between the other terminal of the solenoid 48 and wire D. A lamp 85 for indicating actuation of this circuit may be connected in parallel with the solenoid 48 between the wires D and I.

The motor 26 is connected to its source of supply of electric energy through the lead wires K, L and M by the switch 83 which is operated by the solenoid 82.

The mode of operation of the wash box 7 and its discharge control device will now be described.

A starting mixture of mineral particles of different specific gravities and water is introduced into the feed end of the front section of the wash box 7. This mixture is immediately subjected to the pulsion and suction strokes of the wash or hutch water that moves upwardly and downwardly through the material bed supporting screen 10. These pulsion and suction strokes of the water effect stratification of the higher and lower gravity mineral particles. In other words, the higher gravity particles begin to accumulate in the lower portion of the bed of material B while the lower gravity particles begin to accumulate in the upper portion of the bed. A definite stratum of higher gravity particles is formed by the time the particles reach the discharge chute 11.

The bed of material B will be advanced lengthwise of the front section, while the particles are being stratified, by the flow which results from the introduction of water with the mineral particles at the feed end of the wash box 7 and the removal of water from the discharge end of the wash box.

During each pulsion stroke of the wash water, some of the lighter gravity particles, along with some wash water, spill over the discharge end into the sluice 19. The discharge gate 12 is operated intermittently to remove the heavier gravity particles in the lower stratum of the material bed B. It is noted that, unless carefully controlled, the thickness of the stratum of the heavier gravity particles might increase to the point where they would be intermixed with the lighter gravity particles spilling into the sluice 19. On the other hand, the stratum of heavier gravity particles must not be completely removed or a portion of the lighter gravity particles might be discharged through the discharge gate 12.

The operation of the device which controls the intermittent operation of the discharge gate will be described as follows:

Compressed air from a suitable supply source enters the tube 65 through the pressure reducing valve 66 at a relatively low constant pressure. The pressure of the air in the tube 65 may be further and more readily adjusted from time-to-time by the valve 69 in the venting tube 68 to maintain the flow of air through the tube and the pipe 70 against any pressure condition which will be encountered at the discharge opening 71. It will be noted that if at any time air fails to flow through the tube 65 and the pipe 70, the flow indicator bulb 67 will, by the absence of bubbles therein, indicate such a condition. The valve 69, therefore, can be easily adjusted to compensate for any deviation from the normal operating conditions of the control mechanism. The air flowing through the tube 65 and the pipe 70 is continuously discharged through the opening 71 near the bottom of the material bed B.

As the thickness or depth of the stratum of heavier material particles in the bed B becomes greater, the resistance to the flow of the water through the stratum will increase and there will be a corresponding increase in the hydrostatic pressure of the water at the discharge opening 71. This increase in the hydrostatic pressure acts to further resist the discharge of air from the opening 71 whereby the pressure of the air in the pipe 70 will increase by an amount substantially equal to the increase in the hydrostatic pressure. In order to more accurately measure this increase in hydrostatic pressure which is due to the increased resistance of the stratum of heavier particles, the discharge opening 71 is located on the side of the pipe 70. When so located, the discharge opening 71 is not subjected to pressure due to the velocity of the pulsating water but only to the hydrostatic pressure at the opening.

It has been found that variations in the thickness of the stratum of heavier particles are most accurately indicated by the variations in the pressure of the water when it is rising during its pulsion strokes to fully open or lift the bed of material particles B. The switch operating lug 80, therefore, is so located on the cam 23 which operates the valve 22 that the valve 73 is opened during the proper portion of each pulsion stroke to subject the header 72 to pressure equal to the hydrostatic pressure of the water during the above discussed portion of successive pulsations.

Variations in the thickness of the stratum of heavier particles, therefore, result in variations in the hydrostatic pressure of the water at the discharge opening 71 to in turn cause variations in the pressure of the air in the pipe 70. The pressures of the air in the pipe 70 are impressed upon the pressure responsive switches 75 and 76 during the desired portion of successive pulsations. The pressure responsive switch 75 is adjusted to operate at a pressure lower than that required to operate the pressure responsive switch 76. The effect of this adjustment is to provide for the actuation of the motor 26 to drive the discharge gate 12 at its minimum discharge capacity when the stratum of heavier particles has reached a certain depth. If the thickness of the stratum of heavier particles continues to increase, the hydrostatic pressure of the water will increase so that the pressure responsive switch 76 will be actuated to cause operation of the valve 47. This operation of the valve 47 in turn causes the cylinder 45 and its piston 46 to function, as heretofore described, to increase the rate of discharge effected by the gate 12. The adjustment of the pressure responsive switches 75 and 76, will, of course, vary according to the type of material being processed by the washing jig, but defects in the initial adjustment of the switches may be readily corrected to provide a close and efficient control for the depth of the stratum of heavier particles in the wash box 7.

Having thus described the invention, I claim:

1. In a device of the type described, the combination with a wash box having a bed of materials therein adapted to be acted upon by a body of washing liquid, means for producing a pulsating flow of the washing liquid through said bed of materials, a rotary gate for discharging materials from said box, and a drive for said gate, of means for introducing compressed air solely as a control fluid directly into and against the pressure of the washing liquid at the point of introduction, said washing liquid pressure at said point of introduction of said control fluid varying proportionately with changes in the hydraulic resistance of the material bed, a pressure responsive device for controlling the periods of actuation of the drive for said gate, and means operatively connecting said control device to said introducing means during like portions of successive pulsations of the washing liquid for response of the control device to the pressure prevailing in said introducing means when so connected.

2. In a device of the type described, the combination with a wash box having a bed of materials therein adapted to be acted upon by a body of washing liquid, means for producing a pulsating flow of the washing liquid through said bed of materials, a rotary gate for discharging materials from said box, and a drive for said gate, of a pipe for continuously discharging compressed air solely as a control fluid directly into the bed of material at a point near the bottom of said bed and at pressures varying in proportion to the variable hydrostatic pressures of the washing liquid at said point, pressure responsive means, means for establishing communication between said pipe and said pressure responsive means during like portions of successive pulsations of the washing liquid whereby said varying compressed air pressures in said pipe are impressed upon said pressure responsive means, and means controlled by said pressure responsive means for controlling the actuation of the drive for said gate.

3. In a device of the type described, the combination with a wash box having a bed of materials therein adapted to be acted upon by a body of washing liquid, means for producing a pulsating flow of the washing liquid through said bed of materials, a rotary gate for discharging materials from said box, and a drive for said gate, of means for introducing compressed air solely as a control fluid directly into the bed of material at a point near the bottom of said bed and at pressures varying in proportion to the variable hydrostatic pressures of the washing liquid at said point, a pressure responsive switch in fluid communication with said introducing means during corresponding portions of successive pulsations of the washing liquid and operating in response to changes in the compressed air pressure prevailing in the introducing means, and means controlled by said pressure responsive switch for controlling the actuation of the drive for said gate.

4. In a device of the type described, the combination with a wash box having a bed of materials therein adapted to be acted upon by a body of washing liquid, means for producing a pulsating flow of the washing liquid through said bed of materials, a rotary gate for discharging materials from said box, a prime mover, and transmission means including an adjustable throw step-by-step drive between said prime mover and said gate, of a pipe having an opening for discharging compressed air solely as a control fluid directly into the bed of material at a point near the bottom of said bed and at pressures varying in proportion to the variable pressures of the washing liquid at said point, pressure responsive means, means for establishing communication between the pressure responsive means and said pipe during like portions of successive pulsations whereby the compressed air pressures in said pipe are impressed upon said pressure responsive means, means controlled by said pressure responsive means for controlling the actuation of said prime mover, and means controlled by said pressure responsive means for adjusting the effective length of throw of said step-by-step drive.

5. In a device of the type described, the combination with a wash box having a bed of materials therein adapted to be acted upon by a body of washing liquid, means for producing a pulsating flow of the washing liquid through said bed of materials, a rotary gate for discharging materials from said box, a prime mover, and transmission means including an adjustable throw step-by-step drive between said prime mover and said gate, of a pipe having an opening for discharging compressed air solely as a control fluid directly into the bed of material at a point near the bottom of said bed and at pressures varying in proportion to the variable pressures of the washing liquid at said point, a pair of pressure responsive switches, means for establishing communication between said pressure responsive switches and said pipe during like portions of successive pulsations of said washing liquid whereby the compressed air pressures in said pipe are impressed upon said pressure responsive switches, means controlled by one of said pressure responsive switches for controlling actuation of said prime mover, and means controlled by the other of said pressure responsive switches for adjusting the effective length of throw of said step-by-step drive.

6. In a device of the type described, the combination with a wash box having a bed of materials therein adapted to be acted upon by a body of washing liquid, means for producing a pulsating flow of the washing liquid through said bed of materials, a rotary gate for discharging materials from said box, a prime mover, and transmission means including an adjustable throw step-by-step drive between said prime mover and said gate, of a pipe having an opening for discharging compressed air solely as a control fluid directly into the bed of materials at a point near the bottom of said bed and at pressures varying in proportion to the variable pressures of the washing liquid at said point, a pair of pressure responsive switches, tubing connecting said pressure responsive switches and said pipe whereby the compressed air pressures in said pipe are impressed upon said pressure responsive switches, a valve in said tubing, means for closing said valve to prevent communication of pressure through said tubing during like major portions of successive pulsations of said washing liquid, means controlled by one of said pressure responsive switches for controlling actuation of said prime mover, and means controlled by the other of said pressure responsive switches for adjusting the effective length of throw of said step-by-step drive.

7. In a device of the type described, the combination with a wash box having a bed of materials therein adapted to be acted upon by a body of washing liquid, means for producing a pulsating flow of the washing liquid through said bed of materials, a rotary gate for discharging materials from said box, a prime mover, and transmission means including an adjustable throw step-by-step drive between said prime mover and said gate, of a pipe having an opening for discharging compressed air solely as a control fluid directly into the bed of materials at a point near the bottom of said bed and at pressures varying in proportion to the variable pressure of the washing liquid at said point, a pressure fluid operated switch adapted to be actuated by a given fluid pressure, a second pressure fluid operated switch adapted to be actuated by a greater fluid pressure, tubing connecting said switches and said pipe whereby the compressed air pressures in said pipe are impressed upon said pressure responsive switches, a valve in said tubing, means for operating said valve to close said tubing during like portions of successive pulsations of said washing liquid, a relay, having its energizing circuit controlled by said first mentioned switch, for controlling the operation of said prime mover, and means controlled by the actuation of said second mentioned switch for adjusting the effective length of throw of said step-by-step drive.

8. A device for controlling the thickness of the high gravity stratum of a material bed in a wash box, comprising means for discharging the high gravity particles from the lower portion of a material bed in a wash box, means for actuating said discharge means, a switch for starting and stopping said actuating means, fluid pressure actuated means for operating said switch, means for continuously discharging compressed air solely as a control fluid directly into the bottom portion of the high gravity stratum of a material bed and at pressures varying in proportion to the variable hydrostatic pressures at said point, and means for applying to the fluid pressure actuated means the pressures of the compressed air in said air discharging means.

9. A device for controlling the thickness of the high gravity stratum of a material bed in a wash box, comprising means for discharging the high gravity particles from the lower portion of a material bed in a wash box, means for actuating said discharge means, a switch for starting and stopping said actuating means, fluid pressure actuated means for operating said switch, means for varying the rate of discharge of said particles by said discharge means, a second switch for actuating said rate varying means, fluid pressure actuated means for operating said second switch, a pipe for discharging compressed air solely as a control fluid directly into the bottom portion of the high gravity stratum of the material bed and at pressures varying in proportion to the variable hydrostatic pressures at said point, and means for applying to each fluid pressure actuated means the pressures of the compressed air in said pipe.

CHARLES W. LOTZ.

REFERENCES CITED

The following references are of record in the file of this patent:

UNITED STATES PATENTS

| Number | Name | Date |
| --- | --- | --- |
| 1,666,189 | Wolf | Apr. 17, 1928 |
| 2,106,204 | Burnell | Jan. 25, 1938 |
| 2,204,644 | Adams | June 18, 1940 |
| 2,334,683 | Smith | Nov. 16, 1943 |

FOREIGN PATENTS

| Number | Country | Date |
| --- | --- | --- |
| 559,062 | Germany | Sept. 15, 1932 |
| 492,259 | Great Britain | Sept. 12, 1938 |
| 687,307 | Germany | Jan. 26, 1940 |

OTHER REFERENCES

Perry, Chemical Engineer's Handbook, 3rd edition 1950, pages 1289, 1290, 1297, 1301, 1309 to 1311.